United States Patent
Moriga et al.

(10) Patent No.: US 6,878,449 B2
(45) Date of Patent: Apr. 12, 2005

(54) SEALING MEMBER FOR A CAP FEATURING EXCELLENT SAFETY AND ENVIRONMENTAL FRIENDLINESS, AND METAL CAP

(75) Inventors: Toshinori Moriga, Kanagawa-ken (JP); Naoki Aoyama, Kanagawa-ken (JP); Hiroyuki Tsuchiya, Tochigi-ken (JP); Takashi Komaki, Tokyo (JP)

(73) Assignees: Japan Crown Cork, Co., Ltd., Tokyo (JP); Toyo Seikan Kaisah, Ltd., Tokyo (JP); Fukuoka Packing Co., Ltd., Saitama-Ken (JP)

( * ) Notice: Subject to any disclaimer, the term of this patent is extended or adjusted under 35 U.S.C. 154(b) by 73 days.

(21) Appl. No.: 10/286,769

(22) Filed: Nov. 4, 2002

(65) Prior Publication Data

US 2003/0087980 A1 May 8, 2003

(30) Foreign Application Priority Data

Nov. 2, 2001 (JP) ........................................ 2001-337983
Jun. 24, 2002 (JP) ........................................ 2002-183215

(51) Int. Cl.[7] .............................................. B32B 27/40
(52) U.S. Cl. .................... 428/425.8; 215/316; 215/341; 215/343; 215/344; 215/346; 215/347; 215/348; 428/35.8; 428/36.5; 428/36.9; 428/423.1; 428/423.7

(58) Field of Search ........................... 428/423.1, 423.7, 428/425.8, 35.8, 36.5, 36.9; 215/316, 341, 343, 344, 346, 347, 348

(56) References Cited

U.S. PATENT DOCUMENTS 1,796,728 A * 3/1931 Sharp ......................... 215/324
4,818,577 A * 4/1989 Ou-Yang ................... 428/36.5

* cited by examiner

Primary Examiner—John M. Cooney, Jr.
(74) Attorney, Agent, or Firm—Sherman & Shalloway

(57) ABSTRACT

A sealing member for a cap featuring excellent cap performance as well as excellent safety and environmental friendliness, and a metallic cap. A foamed polyurethane elastomer having a JIS A hardness of from 15 to 65 and a foaming magnification of from 1.1 to 10 times is used as the sealing member so as to obtain excellent sealing performance, durability, safety and environmental friendliness. The sealing member is provided for a metallic cap shell that has a polyester film formed on the inner surface of the cap, thereby to obtain a cap featuring excellent sealing performance, durability, safety and environmental friendliness.

3 Claims, No Drawings

SEALING MEMBER FOR A CAP FEATURING EXCELLENT SAFETY AND ENVIRONMENTAL FRIENDLINESS, AND METAL CAP

BACKGROUND OF THE INVENTION

1. Field of the Invention

The present invention relates to a sealing member for a cap featuring excellent cap performance as well as excellent safety and environmental friendliness, and to a metallic cap.

2. Description of the Related Art

A cap has a sealing member such as a gasket formed in a portion to where at least the mouth of a container comes in contact to maintain sealing performance. Most of the conventional caps are employing a sealing member made of a plastisol of vinyl chloride since it has a suitable degree of elasticity and workability.

In the case of a metallic cap, the inner surface of the cap comes into direct contact with the content and must, hence, protect the metal body and must prevent the metallic component from eluting out. For this purpose, a resin film has been formed on the surface of the metal body. As the film applied onto the inner surfaces of the caps, there has been used an epoxy film or a vinyl chloride resin film owing to their adhesiveness and workability.

However, the vinyl chloride is a substance that could cause the formation of dioxin and is further often treated by using a large amount of a plasticizer such as dioctyl phthalate which is harmful to the human body. Further, the epoxy resin used for the film uses a bisphenol A (BPA) which is becoming a problem as an environmental hormone, a bisphenol glycidyl ether (BADGE) which is harmful to the human body and a novolak glycidyl ether (NOGE) accompanied by such a probability that these substances may elute out. It is desired to avoid their use particularly as the sealing member or the inner film of the caps that are used in the field of foods.

It has also been known to use a polyurethane resin as a sealing member for the caps (Japanese Unexamined Patent Publication (Kokai) No. 9481/1986). This prior art uses a polyurethane elastomer which contains an aromatic isocyanate.

In order to offer satisfactory sealing performance, easy-to-open performance and durability, on the other hand, the sealing member for the caps must have a hardness of from 10 to 70 (JIS A hardness), a tensile strength of from 1 to 40 MPa and a compressive permanent distortion in a range of from 0.1 to 60%.

There, however, exists a correlation between the hardness and the compressive permanent distortion, and it is difficult to set their properties to lie within the above optimum ranges. That is, there is available no sealing member that satisfies all of the sealing performance, easy-to-open performance and durability. If it is attempted to obtain a polyurethane elastomer containing the aromatic isocyanate and having a low hardness, then, the mechanical strength decreases. Besides, the polyurethane elastomer is colored through the aging.

SUMMARY OF THE INVENTION

It is therefore an object of the present invention to provide a sealing member for a cap featuring excellent safety and environmental friendliness as well as excellent cap performance such as sealing performance, easy-to-open performance and durability without using the above-mentioned materials that involve problems, and to provide a metallic cap.

According to the present invention, there is provided a sealing member for a cap comprising a foamed polyurethane elastomer having a hardness (JIS A hardness) of from 15 to 65 and a foaming magnification of from 1.1 to 10 times.

In the sealing member for the cap of the present invention, it is particularly desired that:

1. the foamed polyurethane elastomer is the one that is formed by containing thermally expanding hollow particles in the polyurethane elastomer so as to be foamed;
2. the polyurethane elastomer is a two-can type polyurethane elastomer comprising a polyisocyanate and a polyol, and at least either the polyisocyanate or the polyol is blended with the thermally expanding hollow particles; and
3. the polyurethane elastomer comprises:
(A) a polyisocyanate containing 5 to 38% by mass of isocyanate groups obtained by modifying an aliphatic isocyanate and/or an alicyclic isocyanate, and having functional groups in an average number of 2 to 3; and
(B) a polyol having a hydroxyl value of from 20 to 350 (mgKOH/g) and functional groups in an average number of 2 to 3.

According to the present invention, there is further provided a metallic cap having a sealing member formed on the inner surface of a metallic cap shell via a film, the film being a polyester film, and the sealing member being a foamed polyurethane elastomer having a hardness (JIS A hardness) of from 15 to 65 and a foaming magnification of from 1.1 to 10 times.

In the metallic cap of the present invention, it is particularly desired that:

1. the polyester film comprises a polyethylene terephthalate film or a polyester coating material; and
2. the polyester coating material is any one of a polyester/amino coating material, a polyester/phenol coating material, a polyester/isocyanate coating material or an aqueous polyester coating material.

DETAILED DESCRIPTION OF THE INVENTION

In order to maintain sealing performance, the sealing member for a cap must, generally, have a flexibility which, if expressed in terms of the JIS A hardness, lies in a range of from 10 to 70. As described above, however, if the hardness of the polyurethane elastomer is adjusted so as to lie within the above range, the compressive permanent distortion increases, the sealing member undergoes a creep deformation due to a reduction in the pressure and an accumulation of the pressure in the container, causing the durability to decrease.

In order to solve the above problem inherent in the prior art, the present invention uses, as a sealing member, a foamed polyurethane elastomer having a hardness (JIA A hardness) of from 15 to 65 and a foaming magnification of from 1.1 to 10 times.

The foaming magnification is defined as a value obtained by dividing the specific gravity of before foaming by the specific gravity of after foaming, i.e., defined as (specific gravity of before foaming)/(specific gravity of after foaming).

That is, the polyurethane elastomer is a high molecular material having excellent adaptability to living body, i.e., to human body, without containing the above-mentioned materials that involve problems, but offering excellent safety and environmental friendliness.

According to the present invention, the elasticity required for the sealing member is not obtained by adjusting the hardness of the polyurethane elastomer itself that is done with the conventional sealing members. But, instead, the polyurethane elastomer to be used is foamed, and the required elasticity (flexibility) is maintained relying upon the degree of foaming. It is therefore allowed to prevent an increase in the compressive permanent distortion that stems from a decrease in the hardness of the polyurethane elastomer, to obtain excellent sealing performance and to sustain sealing performance, i.e., to obtain excellent durability.

It is important that the foamed urethane elastomer used as the sealing member for a cap of the invention has a foaming magnification after the polyurethane elastomer is foamed of from 1.1 to 10 times and, particularly, from 1.2 to 5 times. When the foaming magnification is smaller than the above range, the sealing member exhibits insufficient flexibility and, hence, lacks sealing performance. When the foaming magnification is greater than the above range, on the other hand, the sealing member exhibits flexibility to a sufficient degree. However, too much foaming portion spoils the elasticity of the elastomer. Therefore, the sealing member lacks sealing performance, either.

It is desired that the foamed polyurethane elastomer used in the present invention has a specific gravity of from 1.1 to 2 before being foamed and has a specific gravity which is decreased to be from 0.2 to 1.1 after being foamed.

In the present invention, it is particularly desired to prepare the foamed polyurethane elastomer for forming the sealing member by containing thermally expanding hollow particles as a foaming agent in the polyurethane elastomer.

The thermally expanding hollow particles are those hollow particles of a resin such as methyl methacrylate entrapping a gas that expands upon the heating. By using such a foaming agent, the polyurethane elastomer can be foamed after it is applied to the inner surfaces of the caps, and the sealing agent can be easily formed on the inner surfaces of the caps.

Foaming by using the thermally expanding hollow particles is different from foaming the polyurethane elastomer by using a gas generated by the chemical reaction, and is irrelevant to the reaction of preparing the polyurethane elastomer, and does not impair the reaction. Further, foaming by using the thermally expanding hollow particles does not permit the gas in the particles to easily leak from the interior of the particles. Therefore, the foamed body exhibits the elasticity for extended periods of time and, hence, the sealing member of the present invention exhibits excellent durability. Moreover, outer wrapping portions which are the hollow particles are made of a substance which is harmless to the human body, are not subject to be eluted out, and are excellent from the standpoint of safety and sanitation.

In the present invention, further, it is particularly desired to provide the sealing member in a metallic cap shell which has a polyester film formed in the inner surface thereof. This makes it possible to provide a metallic cap featuring excellent safety and environmental friendliness yet maintaining a function as the metallic cap.

That is, in the metallic cap of the invention, the polyester film formed on the inner surface thereof comprises chiefly a polyester of a carboxylic acid component and an alcohol component, and is formed by applying a polyester coating material containing the polyester as a chief component or by applying a polyester resin.

The polyester does not contain the above-mentioned materials such as bisphenol A and the like that involve problems and, hence, offers excellent safety as well as excellent adhesiveness to the metallic materials, resistance against the content, flavor-retaining property and workability. In the present invention, the polyester having such excellent features is formed as a protection film on the inner surfaces of the caps to protect the metal body.

(Foamed Polyurethane Elastomer)

As the polyurethane elastomer used as a sealing member for a cap of the present invention, there can be preferably used a two-can type polyurethane elastomer obtained by reacting a polyisocyanate component with a polyol component. As the isocyanate, there can be exemplified an aliphatic isocyanate. As the alicyclic isocyanate, there can be exemplified a hydrogenated aromatic isocyanate, a hexamethylene diisocyanate (HDI), an isophorone diisocyanate (IPDI) and a lysine diisocyanate.

Among them, HDI and/or IPDI can be preferably used.

In the present invention, the polyisocyanate component that can be used most desirably is (A) the polyisocyanate component containing 5 to 38% by mass of isocyanate groups obtained by modifying an aliphatic isocyanate and/or an alicyclic isocyanate, and having functional groups in an average number of 2 to 3. It is desired that the polyisocyanate (A) is obtained by modifying the aliphatic isocyanate and/or the alicyclic isocyanate by the dimerizing reaction, trimerizing reaction, polymerizing reaction, or by the urethane-forming reaction, urea-forming reaction, amide-forming reaction, allophanate-forming reaction or biuret-forming reaction of the above isocyanates with a polyfunctional active hydrogen group-containing compound.

The polyisocyanate component (A) contains the isocyanate groups in an amount of from 5 to 38% by mass and, preferably, from 8 to 25% by mass. When the content of the isocyanate groups is smaller than 5% by mass, the polyisocyanate component (A) has a too great viscosity and cannot be easily handled. When the content of the isocyanate groups exceeds 38% by mass, on the other hand, it becomes virtually difficult to suppress the concentration of the free starting isocyanate to be not larger than 1% by mass. The content of the isocyanate groups referred to here stands for the content that undergoes the reaction with the polyol component (B), and is a concept including an isocyanate group blocked with a hydroxyl group or an uretodione group with which two isocyanate groups are cyclically polymerized, and including an isocyanate group stemming from an uretonimine bond in which an isocyanate group is added to a carbodiimide group, which does not exhibit the activity as the isocyanate groups at normal temperature but reproduces the isocyanate group at high temperatures. Here, however, the so-called blocked isocyanate blocked with the hydroxyl group is accompanied by a problem of scattering the blocking agent, and is not desirable in the present invention. The polyisocyanate component (A) has the functional groups in an average number of 2 to 3 from the standpoint of the amount of elution of the polyurethane elastomer and the compressive permanent distortion.

The polyol component that can be used in the present invention is, concretely, a high molecular polyol, a low molecular polyol or a mixture thereof. From the standpoint of easily selecting the properties, it is desired to use a mixture of the high molecular polyol and the low molecular polyol. The high molecular polyol and the low molecular polyol may be those of a single kind or a mixture of two or more kinds, respectively.

The high molecular polyol has a number average molecular weight of not smaller than 500 and, preferably, from 500 to 10,000. Concrete examples include polypropylene glycol, polyetherpolyol (PPG), polytetramethylene ether glycol (PTMG), adipate polyesterpolyol, polycaprolactone polyesterpolyol and polycarbonate polyol, as represented by Preminol and Excenol of Asahi Glass Co. and Acreim of Liondel Co.

Among them, preferred examples of the high molecular polyol are PTMG and adipate polyesterpolyol from the standpoint of elution of the polyurethane elastomer. PTMG and PPG are further preferred from the standpoint of resistance against the hydrolysis. It is desired that the number average molecular weight of the PTMG is from 500 to 2000. When the number average molecular weight exceeds 2000, the PTMG exhibits an increased crystallinity and becomes less easy to handle.

As the low molecular polyol, there can be exemplified ethylene glycol, 1,2-propanediol, 1,3-propanediol, 1,2-butanediol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, cyclohexane-1,4-diol, cyclohexane-1,4-dimethanol, cyclohexane-1,4-dimethanol, dimethylolheptane, dimeric acid diol, trimethylolpropane, glycerine, hexanetriol, quadrol, bisphenol A, hydrogenated bisphenol A, and compounds having a number average molecular weight of smaller than 500 obtained by adding an ethylene oxide or a propylene oxide to the above compounds.

There is no particular limitation on the amount of using the low molecular polyols, and the amount can be suitably selected depending upon the hardness to be imparted to the object polyurethane elastomer. Preferably, however, the low molecular polyol is used in an amount of not larger than 5 mols and, particularly, in a range of from 0.1 to 3 mols per mole of the high molecular polyol.

The polyol component (B) which is most desirably used in the present invention has a hydroxyl value of from 20 to 350 (mgKOH/g) and, preferably, from 100 to 350 (mgKOH/g). When the hydroxyl value is smaller than 20 (mgKoH/g), the obtained polyurethane elastomer becomes too soft and the compressive permanent distortion becomes too great. When the hydroxyl value becomes greater than 350 (mgKOH/g), on the other hand, the obtained polyurethane elastomer becomes too hard and is not suited for use as a sealing member. It is desired that a suitable amount of crosslinking structure is introduced into the polyurethane elastomer. Therefore, the polyol component (B) has functional groups in an average number of 2 to 3 to meet the average number of the functional groups of the polyisocyanate component (A).

In synthesizing the polyurethane elastomer by reacting the polyisocyanate component (A) with the polyol component (B), further, it is desired that the polyisocyanate component (A) is used at such a ratio that the mole number of the isocyanate groups per mole of the active hydrogen atoms is from 0.9 to 1.5 mols and, more preferably, from about 1.00 to about 1.10 mols with respect to the whole amount of the active hydrogen atoms possessed by the polyol component (B) and by other components.

As the method of synthesizing the polyurethane elastomer according to the present invention, any known urethane-forming reaction technology can be employed irrespective of whether it is a prepolymer method or a one-shot method.

It is further desired that the polyurethane elastomer used as the sealing member of the present invention consumes not more than 30 ppm of potassium permanganate in the extraction solution when the retort processing is effected by using 10 ml of water per gram of the polyurethane elastomer at a temperature of 120° C. for 30 minutes.

In the present invention, it is also possible to employ a foaming method by using a known foaming agent such as trichlorofluoromethane in order to foam the polyurethane elastomer. As described above, however, it is particularly desired to use thermally expanding hollow particles from the standpoint of safety and environmental friendliness.

As the thermally expanding hollow particles, it is desired that the outer wrapping portions constituting the particles comprise methyl methacrylate, acrylonitrile or methacrylonitride, and an isopentane solution or a chemical foaming agent is contained in the particles.

It is desired that the thermally expanding hollow particles generally have a particle size of from 10 to 40 $\mu$m, and are expanded to possess a particle size of from 20 to 90 $\mu$m through the heating at a temperature of from 100 to 300° C. and a specific gravity that is decreased down to be from 0.001 to 0.5 times.

As the thermally expanding hollow particles, there can be preferably used Expancel of Expancel Co., Matsumoto Microsphere of Matsumoto Yushi Seiyaku Co., or Cell Powder of Eiwa Kasei Kogyosha Co.

It is desired that the polyurethane elastomer is blended with the thermally expanding hollow particles in an amount of from 0.1 to 9% by weight and, particularly, from 0.2 to 5% by weight.

It is desired that the sealing member of the present invention is a compound in which at least either (A) the liquid polyisocyanate component or (B) the liquid polyol component is blended with the thermally expanding hollow particles, and the grooves of the cap are lined with the above compound which is, then, reacted at 150 to 300° C. for 20 to 200 seconds to thereby integrally form a polyurethane elastomer. When the heating temperature is lower than 150° C., the polyurethane elastomer is not formed to a sufficient degree. When the heating temperature exceeds 300° C., on the other hand, the urethane bond may be decomposed. When the heating time is shorter than 20 seconds, the elastomer is not formed to a sufficient degree. When the heating time exceeds 200 seconds, on the other hand, the productivity decreases and, besides, the production line that is now used for the vinyl chloride plastic sol cannot be used.

When the polyurethane elastomer that has been synthesized in advance is to be used, the polyurethane elastomer is melted and is, then, blended with the thermally expanding hollow particles, and is extruded into the cap shell or is injection-molded therewith as a unitary structure. Or, the polyurethane elastomer powder is blended with the thermally expanding hollow particles and is molded, followed by melting so as to be formed as a unitary structure. The melting temperature is desirably from 150 to 300° C.

The sealing member of the present invention can be blended, as required, with a catalyst, a filler, a coloring agent and an antioxidant that are usually used for the polyurethane resins, as well as a lubricant, flame-retarding agent, an ultrasonic-ray absorber, a photo stabilizer, an electric insulation-improving agent, an anti-molding agent, a silicone surfactant, a metal salt of an organic acid, waxes derived from organic acids, a metal oxide, a metal hydroxide, an internal parting agent, a reinforcing agent and the like agents.

The sealing member of the present invention has a JIS A hardness in a range of from 15 to 65 and, particularly, from 20 to 60, a tensile strength of from 0.1 to 30 MPa, and a compressive permanent stress of from 1 to 60% so as to exhibit excellent sealing performance, easy-to-open performance and excellent durability.

When the JIS A hardness is smaller than 15, the sealing member bites into the mouth of the container excessively, and cannot be easily opened. When the JIS A hardness is larger than 65, the sealing member does not bite into the mouth of the container to a sufficient degree, whereby the sealing area decreases and the sealing becomes defective.

When the tensile strength is smaller than 0.1 MPa, the sealing member lacks mechanical strength and is torn off to lose the sealing performance due to the opening and closing of the closure and due to the accumulation of pressure in the container. When the tensile strength is larger than 30 MPa, the sealing member does not bite into the mouth of the container to a sufficient degree, whereby the sealing area decreases and the sealing becomes defective.

When the compressive permanent distortion is smaller than 1%, the sealing member does not bite into the mouth of the container to a sufficient degree, whereby the sealing area decreases and the sealing becomes defective. When the compressive permanent distortion islarger than 60%, the sealing member undergoes a creep deformation due to a reduction in the pressure in the container and the accumulation of pressure in the container. Therefore, the sealing member is finally torn off along the mouth of the container to lose durability.

(Polyester Film)

In the present invention, the polyester film applied onto the inner surface of the cap shell is formed of the polyester resin film or is formed by applying the polyester coating material as described earlier.

[Polyester Resin Film]

As the polyester resin film, there can be used any film formed of a known thermoplastic polyester resin. Particularly preferably, there can be used a film of a polyester derived from a carboxylic acid component comprising chiefly an aromatic dicarboxylic acid and an alcohol component comprising chiefly an aliphatic diol, and, particularly, a film of a polyester resin in which not less than 50% by mol of the carboxylic acid component comprises a terephthalic acid component and not less than 50% by mol of the alcohol component comprises an ethylene glycol component.

The polyester may be a homopolyester, a copolymerized polyester, or a blend of two or more kinds thereof.

As the carboxylic acid component other than the terephthalic acid component, there can be exemplified isophthalic acid, naphthalenedicarboxylic acid, p-β-oxyethoxybenzoic acid, biphenyl-4,4'-dicarboxylic acid, diphenoxyethane-4,4'-dicarboxylic acid, 5-sodiumsulfoisophthalic acid, hexahydroterephthalic acid, adipic acid, sebacic acid, trimellitic acid and pyromellitic acid.

As the alcohol component other than the ethylene glycol, there can be exemplified such alcohol components as 1,4-butanediol, propylene glycol, neopentyl alcohol, 1,6-hexylene glycol, diethylene glycol, triethylene glycol, cyclohexanedimethanol, ethylene oxide adduct of bisphenol A, glycerol, trimethylolpropane, pentaerythritol, dipentaerythritol and sorbitan.

Though not limited thereto only, suitable examples of the polyester constituting the polyester resin film include polyethylene terephthalate, polybutylene terephthalate, polyethylene-2,6-naphthalate, polyethylene terephthalate/isophthalate, polybutylene terephthalate/isophthalate, polyethylene-2,6-naphthalate/terephthalate, polyethylene terephthalate, polybutylene terephthalate/adipate, polyethylene-2,6-naphthalate/isophthalate, polybutylene terephthalate/adipate, or a blend of two or more kinds thereof.

Among them, the polyethylene terephthalate film can be preferably used.

The polyester resin should have a molecular weight capable of forming a film, and an inherent viscosity of from 0.6 to 1.5, and a glass transition point of from 30 to 100° C.

The poyester resin film used in the present invention may be either an undrawn film or a biaxially drawn film.

The metal body can be coated with the resin film by any means such as an extrusion-coating method, a method of thermally adhering cast film, or a method of thermally adhering a biaxially drawn film.

Though not limited thereto only, it is desired that the resin film has a thickness generally in a range of from 3 to 30 $\mu$m.

[Polyester Coating Material]

As the polyester coating material, there can be preferably used a solvent-type coating material comprising the polyester resin as a chief component and blended with a thermosetting resin such as amino resin, phenol resin, isocyanate resin or thermosetting acrylic resin, and an aqueous polyester coating material obtained by modifying the polyester resin with an acrylic resin.

By using the polyester coating material comprising the polyester resin and the thermosetting resin, the film of polyester serves as a base, and the film is further constituted by curing chiefly the thermosetting resin. That is, the polyester resin and the thermosetting resin do not substantially react with each other, and the resin in the coating material is cured as the thermosetting resin undergoes the reaction thereby to form an inter-penetrating network (IPN) structure in the film. Upon forming the inter-penetrating network structure, the curing property and the barrier property against the corrosive component are improved while maintaining excellent film-adhering property and workability.

The polyester resin which is the chief component is preferably the one exemplified in connection with the polyester resin film, and, generally, has a number average molecular weight of from 4,000 to 25,000, a glass transition point of from 40 to 100° C., and a reduced viscosity of from 0.25 to 0.70 dl/g.

Described below are examples of the thermosetting resin.

(a) Thermosetting Acrylic Resin.

The thermosetting acrylic resin which can be used for the polyester coating material of the invention in combination with the polyester resin, is a self-curing acrylic resin which, by itself, undergoes the curing reaction without the need of using a curing agent. It is desired that the thermosetting acrylic resin is an acrylic resin comprising a (meth)acrylic acid ester as a chief component, an aromatic vinyl monomer, and an ethylenically unsaturated monomer having a crosslinking functional group.

(b) Amino Resin.

As the amino resin that can be used for the polyester coating material of the invention in combination with the polyester resin, there can be exemplified a melamine resin or a benzoguanamine resin, which may be used alone or may be used being blended together.

It is desired that the amino resin has a basic nitrogen atom concentration of from 7 to 15 gram atoms per 100 grams of the resin, and a concentration of methylol groups and etherified methylol groups in a range of from 0.5 to 1.5 millimols.

(c) Isocyanate Resin.

The isocyanate resin which can be used for the polyester coating material of the invention in combination with the polyester resin, is (i) the one of the two-can type comprising a main agent having an active hydrogen group, such as polyol or polyamine, and a polyisocyanate curing agent, (ii) the one of the one-can type comprising a chief agent having an active hydrogen group blended with a blocked isocyanate, or (iii) the one of the one-can type comprising a resin having an isocyanate group. Particularly preferred examples of the isocyanate resin include hexamethylene diisocyanate (HDI) trimer, isophorone diisocyanate (IPDI) trimer, HDI adduct and IPDI adduct.

(d) Phenol Resin.

It is desired that the phenolic resin which can be used for the polyester coating material of the invention in combination with the polyester resin, is a resol-type phenolic resin derived from phenols comprising carbolic acid and/or meta-cresol and from a formaldehyde or a functional derivative thereof.

It is desired that the polyester coating material is obtained by blending the polyester resin and the thermosetting resin at a ratio of from 95:5 to 60:40.

It is further desired that the coating material contains the solvent in an amount of from 150 to 500 parts by weight per 100 parts by weight of the resin component.

Any known solvent can be used provided it is capable of dissolving the above-mentioned resin component, such as isopropyl alcohol, isobutyl acetate, n-butanol and Sorbesso 110.

Concretely speaking, there can be used, as the polyester coating material, a polyester/thermosetting acrylic coating material (Japanese Unexamined Patent Publication (Kokai) No. 290585/2000), polyester/amino coating materials (Japanese Unexamined Patent Publications (Kokai) Nos. 19876/2001 and 19877/2001, and Japanese Patent Application No. 374890/2000), and a polyester/phenolic coating material (Japanese Patent Application No. 147058/2001) by the present inventors.

Further, a concrete example of the aqueous polyester coating material is an aqueous coating material (Japanese Patent Application No. 148339/2001) comprising an isocyanate curing agent and an acrylic-modified aromatic polyester resin to which water dispersing property is imparted by the modification with an acrylic resin and by the neutralization with bases.

The polyester coating material used in the present invention can be applied by any known method such as application by immersion, roller coating, spray coating or electrodeposition. The conditions for firing the coating material may vary depending upon the kind of the coating material that is used, but is generally in a range of from 150 to 300° C. for 0.2 to 30 minutes.

The film obtained by heating and curing the polyester coating material used in the present invention has a glass transition point of not lower than 40° C., an MEK extraction factor of not larger than 40%, and exhibits excellent film properties such as excellent workability, corrosion resistance and adhesiveness.

(Metallic Cap)

The metallic cap of the present invention may assume any shape that has been known per se. For example, there can be employed the shapes of caps of the press screw type, such as screw cap and twist-off cap, cap of roll-on type, such as pilfer-proof cap, and cap of the crimp type, such as crown and maxi-cap.

The metal blank used for the present invention may be any blank that has heretofore been used for the conventional metal caps, such as tin plate, tin-free steel plate, laminated steel plate, stainless steel plate and aluminum plate.

In producing the metallic cap of the present invention, the resin-coated metal plate on which the polyester film has been formed in advance may be formed in the shape of a desired cap shell or the metal blank may be formed in the shape of a desired cap shell and, then, may be coated with the polyester coating material so as to form a film thereon.

To form the sealing member in the cap, the grooves in the closure are lined with the mixture of the polyisocyanate component (A) and the polyol component (B), which is, then, reacted at 150 to 240° C. for 20 to 200 seconds in order to integrally form the polyurethane elastomer in the cap.

When the polyurethane elastomer that has been synthesized in advance is to be used for the production of the metallic caps for food containers, the polyurethane elastomer is melted and is extruded into the metallic cap shells on which the polyester film has been formed already or is injection-molded so as to be formed integrally therewith. Or, the polyurethane elastomer powder is formed and is melted so as to be formed integrally together. The melting temperature is desirably from 150 to 240° C.

EXAMPLES

The invention will now be described by way of Examples in which "parts", "%" and "ratio" are all by weight unless stated otherwise.

Preparation Example 1

Polyisocyanate Component A 78.9 Parts of an HDI (hexamethylene diisocyanate) and 21.1 parts of a 1,3-BG (butylene glycol) were fed into a reaction vessel, and were reacted at 70° C. for 5 hours to obtain a viscous solution having functional groups in an average number of 2 and containing 19.7% of isocyanate groups. This was referred to as a polyisocyanate component A.

The content of the isocyanate groups was measured in compliance with the method of JIS-K7301.

Preparation Example 2

Polyisocyanate Component B 70.7 Parts of the HDI, 7.6 parts of the 1,3-BG, 6.6 g of a neopentyl glycol and 15.2 g a hydrogenated bisphenol A were fed into a reaction vessel, and were reacted at 70° C. for 5 hours to obtain a viscous solution having functional groups in an average number of 2 and containing 17.6% of isocyanate groups. This was referred to as a polyisocyanate component B.

Preparation Example 3

Polyol Component A

41 Parts of a polytetramethylene glycol PTG-1000SN manufactured by Hodogaya Kagaku Kogyo Co. (hydroxyl value of 112, average number of functional groups of 2), 13 parts of an adipate-type polyester glycol P-1010 manufactured by Kuraray Co. (hydroxyl value of 112, average number of functional groups of 2), and 8 parts of an adipate-type polyestertriol manufactured by Kuraray Co. (hydroxyl value of 336, average number of functional groups of 3) were mixed together in advance to prepare a polyol component A in a liquid state.

The hydroxyl value of the polyol was measured in compliance with the method of JIS-K1601.

Preparation Example 4

Polyol Component B

63 Parts of a polytetramethylene glycol PTG-1000SN manufactured by Hodogaya Kagaku Kogyo Co. (hydroxyl value of 112, average number of functional groups of 2) and 1.5 parts of an N,N,N',N'-tetrakis(2-hydroxypropyl) ethylenediamine EDP-300 manufactured by Asahi Denka Co. were mixed together in advance to prepare a polyol component B in a liquid state.

Preparation Example 5

Polyester/Isocyanate Coating Material

A polyester/blocked isocyanate coating material having 20% of a solid component and a #4 Ford cup viscosity (25° C.) of 40 seconds, was prepared from 90 parts of a polyester resin (Byron 200 manufactured by Toyo Boseki Co., Tg=67° C., Mn=17,000, hydroxyl value=6 mgKOH/g), 10 parts of a hexamethyene diisocyanate blocked with a methyl ethyl ketone oxime and 400 parts of a mixed solvent.

Further, titanium oxide was dispersed in the above coating material to prepare a polyester/blocked isocyanate/white coating material having 33% of a solid component, 19.8% of a resin component, containing 13.2% of titanium oxide and having a #4 Ford cup viscosity (25° C.) of 70 seconds.

Preparation Example 6

Polyester/Phenol Coating Material

A polyester/phenol coating material having 25% of a solid component and a #4 Ford cup viscosity (25° C.) of 55 seconds, was prepared from 85 parts of a polyester resin of terephthalic acid/propylene glycol/ethylene glycol/cyclohexane dimethanol=66/17/7/10, Tg=73° C., Mn=7000, hydroxyl value=20 mgKOH/g, 15 parts of a butyl alkylated phenol resin (number of methylol groups or of etherified methylol groups=1.8 per a benzene ring, Mn=900) derived from the starting materials of m-cresol, formaldehyde and butanol, 0.3 parts of dodecylbenzenesulfonic acid catalyst and 300.9 parts of a mixed solvent.

[Evaluation Test]

Transverse Pressure Test.

A capped bottle is inverted, the load is exerted on the closure portion from the side direction, and the load at a moment when the content starts leaking is measured, and is regarded as the transverse load. The load is measured by using the Tensilon, and the test is conducted by exerting the load at a rate of 1 mm/min.

○: 40 kgf or larger

Δ: 20 to 40 kgf

X: smaller than 20 kgf

Falling Test.

The capped bottle is allowed to fall in an inverted state on an inclined surface inclined at 30° from a height of 30 cm. The leaking ratio is evaluated, and a reduction in the pressure of 30 mmHg or less is counted as leaking.

○: 0%

Δ: 30% or less

X: not smaller than 30%

Cap-Opening Test.

The capped bottle is preserved at room temperature for 2 weeks and the torque for opening the cap is measured to evaluate the cap-opening performance.

○: 35 kgf·cm or less

Δ: 35 to 50 kgf·cm

X: not smaller than 50 kgf·cm

Example 1

Into 62 parts of the polyol component A of Preparation Example 3 were mixed 25 parts of talc, 2 parts of titanium oxide, 2 parts of amide oleate, 2 parts of erucic amide, 2 parts of silicone oil, 0.3 parts of Irganox 1010, 300 ppm/polyol of di(n-octyl)tin maleate polymer KS-1010A-1 of Kyodo Yakuhin Co., and 0.5 parts of thermally expanding hollow particules (Expancel 091DU of Expancel Co.) to prepare a polyol compound.

A tin plate (tin-plating amount, 2.8 g/m$^2$) having a thickness of 0.155 mm was prepared, and the polyester/blocked isocyanate/white coating material of Preparation Example 5 was applied onto the inner surface thereof in an amount of 80 mg/dm$^2$ and was fired under a condition of 190° C. for 8 minutes. Then, onto the outer surface were applied the size coating material, white coating material and luster varnish in this order and, finally, the polyester/blocked isocyanate coating material of Preparation Example 5 was applied as the inner surface top coating in an amount of 30 mg/dm$^2$ followed by firing under a condition of 180° C. for 8 minutes to thereby prepare the coated plate. The MEK extraction factor on the inner surface of the coated plate was 30%.

A twist-off cap (white cap) shell having a diameter of 53 mm was formed by press from the above coated plate.

38 Parts of the polyisocyanate component A of the preparation example 1 was quickly mixed into the above polyol compound and was defoamed and with which the grooves in the outer periphery on the inner surface of the cap shell were lined by using a lining device, followed by firing at 215° C. for 50 seconds to produce the twist-off cap and the sealing member for the cap.

The sealing member for the cap was applied in an amount of 0.75 g, the foaming magnification was 1.54, the specific gravity after foaming was 0.78, and the JIS A hardness was 41.

A glass bottle having a volume of 155 cm$^3$ was filled with 140 g of hot water heated at 90° C., closed with the above twist-off cap under a condition of a pull-up value of 8 mm, and was retort-treated under a condition of 125° C. for 30 minutes.

The retort extraction water was analyzed for bisphenol A (BPA), bisphenol glycidyl ether (BADGE), novolak glycidyl ether (NOGE) and phthalic acid plasticizer by the GC-MS (gas-mass) method at a detection limit of 1 ppb. However, none of these substances were detected. Further, the amount of organic matter eluted in the retort extraction water was measured as the amount of consumption of potassium permanganate at a detection limit of 0.5 ppm to find that the amount was not larger than the detection limit. The pressure reduction value remained normal even after the passage of one month at 37° C. exhibiting good retort resistance and long-term sealing performance. When the cap was opened, the sealing member (liner) exhibited good appearance, and a good adhering state was maintained between the sealing member and the closure.

Next, the glass bottle having the volume of 155 cm$^3$ was filled with 140 g of hot water heated at 90° C., closed with the above twist-off cap under a condition of a pull-up value of 8 mm, left to cool, preserved at room temperature for one week, and was put to the transverse-pressure test and to the falling test. There was exhibited excellent sealing performance such as a transverse load of 70 kgf and a fall-leakage ratio of 0%.

After preserved for two weeks, the cap-opening performance was evaluated to be favorable requiring a cap-opening torque of 26 kgf·cm.

The glass bottle was filled with a blueberry jam at 85° C., closed with the twist-off cap, and was sterilized with hot water heated at 90° C. for 40 minutes. The glass bottle was preserved at 50° C. for one month and the cap was opened to observe the inner surface of the cap. There was observed no abnormal condition, and the inner surface of the cap exhibited favorable resistance against the content withstanding the blueberry jam.

Examples 2 to 5, Comparative Examples 1 and 2

Various sealing members for caps having different specific gravities after foaming and different hardnesses as well as various twist-off caps were prepared in the same manner as in Example 1 but changing the amount of addition of the thermally expanding hollow particulate Expancel. The sealing members for the caps were adjusted to possess thicknesses in a range of from 1.3 to 1.5 mm by adjusting the amount of application. The sealing members for caps of Examples 2 to 5 and Comparative Examples 1 and 2 were evaluated in the same manner as in Example 1.

The tested results were as shown in Table 1.

It will be understood from these results that when the hardness exceeds 65 and the foaming magnification becomes smaller than 1.1, the results of the transverse-pressure test and of the falling test become inferior and, besides, the cap-opening performance becomes inferior since the force of the sealing member pushing the mouth of the bottle becomes too strong. When the hardness becomes smaller than 15 and the foaming magnification exceeds 10, on the other hand, cracks (cut throughs) occur in the sealing member in the retort testing, and the pressure reduction value decreases in the long-term preservation testing. This is considered to be stemming from the lack of mechanical strength of the sealing member and the lack of resistance against creeping. The cap-opening performance, too, becomes inferior since the sealing member bites greatly into the mouth of the bottle.

As for the jam preservation testing, no abnormal condition was recognized in the sealing members of Examples 2 to 5 and of Comparative Examples 1 and 2.

Example 6

Into 62 parts of the polyol component B of Preparation Example 4 were mixed 25 parts of talc, 2 parts of titanium oxide, 2 parts of amide oleate, 2 parts of erucic amide, 2 parts of silicone oil, 0.3 parts of Irganox 1010, 250 ppm/polyol of dioctyltin dilaurate, and 1.0 part of thermally expanding hollow particles (Matsumoto Microsphere F-50D of Matsumoto Yushi Seiyaku Co.) to prepare a polyol compound.

A tin plate (tin-plating amount, 2.8 g/m$^2$) having a thickness of 0.155 mm was prepared, and the polyester phenol coating material of Preparation Example 6 was applied onto the inner surface thereof in an amount of 40 mg/dm$^2$ and was fired under a condition of 190° C. for 8 minutes. Then, onto the outer surface were applied the size coating material, white coating material and luster varnish in this order and, finally, the polyester/blocked isocyanate white coating material of Preparation Example 5 was applied as the inner surface top coating in an amount of 80 mg/dm$^2$ followed by firing under a condition of 190° C. for 8 minutes to thereby prepare the coated plate. The MEK extraction factor on the inner surface of the coated plate was 25%.

A twist-off cap (white cap) shell having a diameter of 53 mm was formed by press from the above coated plate.

38 Parts of the polyisocyanate component B of the preparation example 2 was quickly mixed into the above polyol compound and was defoamed and with which the grooves in the outer periphery on the inner surface of the cap shell were lined by using a lining device, followed by firing at 215° C. for 50 seconds to produce the twist-off cap and the sealing member for the cap.

The sealing member for the cap was applied in an amount of 0.75 g, the foaming magnification was 1.5, the specific gravity after foaming was 0.80, and the JIS A hardness was 45.

A glass bottle having a volume of 155 cm$^3$ was filled with 140 g of hot water heated at 90° C., closed with the above twist-off cap under a condition of a pull-up value of 8 mm, and was retort-treated under a condition of 125° C. for 30 minutes.

The retort extraction water was analyzed for BPA, BADGE, NOGE and phthalic acid plasticizer by the GC-MS (gas-mass) method at a detection limit of 1 ppb. However, none of these substances were detected. Further, the amount of organic matter eluted in the retort extraction water was measured as the amount of consumption of potassium permanganate at a detection limit of 0.5 ppm to find that the amount was not larger than the detection limit. The pressure reduction value remained normal even after the passage of one month at 37° C. exhibiting good retort resistance and long-term sealing performance. When the cap was opened, the sealing member (liner) exhibited good appearance, and a good adhering state was maintained between the sealing member and the closure.

Next, the glass bottle having the volume of 155 cm$^3$ was filled with 140 g of hot water heated at 90° C., closed with the above twist-off cap under a condition of a pull-up value of 8 mm, left to cool, preserved at room temperature for one week, and was put to the transverse-pressure test and to the falling test. There was exhibited excellent sealing performance such as a transverse load of 65 kgf and a fall-leakage ratio of 0%.

After preserved for two weeks, the cap-opening performance was evaluated to be favorable requiring a cap-opening torque of 31 kgf·cm.

The glass bottle was filled with pickled scallions at 50° C., closed with the twist-off cap, and was sterilized with hot water heated at 90° C. for 10 minutes. The glass bottle was preserved at 37° C. for two months and the cap was opened to observe the inner surface of the cap. There was observed no abnormal condition, and the inner surface of the cap exhibited favorable resistance against the content withstanding the pickled scallions.

In Examples and in Comparative Examples, the MEK extraction factors were measured in a manner as described below.

The film on the outer surface of the coated plate was peeled by a decomposition method using concentrated sulfuric acid. After dried, the coated plate was cut out and was used as a sample. After the weight is measured ($W_1$), the extraction is conducted by using MEK (methyl ethyl ketone) in an amount of 1 ml per 2 cm$^2$ of the film at a boiling point thereof for one hour. After the extraction, the coated plate was dried under a condition of 130° C. for one hour, and the weight ($W_2$) of the coated plate after the extraction was measured. The film is further peeled by the decomposition method using concentrated sulfuric acid, and the weight ($W_3$) of the plate was measured. The MEK extraction factor of the coated plate was found in compliance with the following formula, $$(MEK\ \text{extraction factor}\ \%) = 100 \times (W_1 - W_2)/(W_1 - W_3)$$

TABLE 1

(Examples 1 to 5, Comparative Examples 1 and 2)

| Ex. No., Comp. Ex. No. | Example 1 | Example 2 | Example 3 | Example 4 | Example 5 | Comparative Example 1 | Comparative Example 2 |
|---|---|---|---|---|---|---|---|
| Amount of Expancel (parts) | 0.5 | 2 | 0.3 | 5 | 0.2 | 10 | 0.05 |
| Hardness JIS-A | 41 | 33 | 52 | 20 | 60 | 10 | 70 |
| Foaming magnification | 1.54 | 2.35 | 1.3 | 4.8 | 1.2 | 11 | 1.03 |
| BPA (ppb) | ND | ND | ND | ND | ND | ND | ND |
| BADGE (ppb) | ND | ND | ND | ND | ND | ND | ND |
| NOGE (ppb) | ND | ND | ND | ND | ND | ND | ND |
| Phthalic plasticizer (ppb) | ND | ND | ND | ND | ND | ND | ND |
| Consumption of $KmnO_4$ (ppm) | ND | ND | ND | 0.6 | ND | 1.0 | ND |
| Retort resistance | ○ | ○ | ○ | Δ | ○ | X | ○ |
| Long-term sealing | ○ | ○ | ○ | Δ | ○ | X | ○ |
| Trans-pressure test | ○ | ○ | ○ | ○ | Δ | ○ | X |
| Falling test | ○ | ○ | ○ | ○ | Δ | ○ | X |
| Cap-opening test | ○ | ○ | ○ | Δ | Δ | X | X |

Amount of Expancel: Amount of addition per 100 parts of polyurethane elastomer
ND: Not detected

What is claimed is:

1. A metallic qap having a sealing member formed on a film of the inner surface of a metallic cap shell, said film being a polyester film, and the sealing member comprising a foamed polyurethane elastomer having a hardness (JIS A hardness) of from 15 to 65 and a foaming magnification of from 1.1 to 10 times.

2. A metallic cap according to claim 1, wherein said polyester film comprises a polyethylene terephthalate film or a polyester coating material.

3. A metallic cap according to claim 2, wherein said polyester coating material is any one of a polyester/amino coating material, a polyester/phenol coating material, a polyester/isocyanate coating material or an aqueous polyester coating material.

* * * * *